United States Patent [19]

Leckel et al.

[11] Patent Number: 5,825,530
[45] Date of Patent: Oct. 20, 1998

[54] ARRANGEMENT AND METHOD FOR OPERATING AND TESTING AN OPTICAL DEVICE

[75] Inventors: Edgar Leckel, Jettingen; Emmerich Mueller, Aidlingen, both of Germany

[73] Assignee: Hewlett-Packard Company, Palo Alto, Calif.

[21] Appl. No.: 689,973

[22] Filed: Aug. 16, 1996

Related U.S. Application Data

[63] Continuation-in-part of Ser. No. 565,379, Nov. 30, 1995, abandoned.

[30] Foreign Application Priority Data

Dec. 2, 1994 [EP] European Pat. Off. ............. 94119012
Jun. 1, 1996 [EP] European Pat. Off. ............. 96108813

[51] Int. Cl.$^6$ .............................. H01S 3/00; G01N 21/00
[52] U.S. Cl. ....................... 359/333; 359/110; 359/180; 356/72; 356/73; 356/73.1
[58] Field of Search .................. 356/72, 73, 73.1; 354/110, 123, 333, 180, 187

[56] References Cited

U.S. PATENT DOCUMENTS

| | | | |
|---|---|---|---|
| 4,789,237 | 12/1988 | Inoue ..................................... | 356/73.1 |
| 4,971,437 | 11/1990 | van Gijzel ............................. | 356/73 |
| 5,239,607 | 8/1993 | da Silva et al. ...................... | 385/122 |
| 5,339,183 | 8/1994 | Suzuki .................................. | 359/123 |
| 5,357,333 | 10/1994 | DeBernardi et al. ................. | 356/73.1 |
| 5,479,291 | 12/1995 | Smith et al. .......................... | 359/333 |

FOREIGN PATENT DOCUMENTS

| | | |
|---|---|---|
| 548935A1 | 12/1992 | European Pat. Off. . |
| 667688A1 | 8/1995 | European Pat. Off. . |
| 716515A1 | 6/1996 | European Pat. Off. . |

OTHER PUBLICATIONS

Journal of Lightwave Technology, vol. 12, No. 3, Mar. 1994, pp. 463–470, K. Kikushima, "AC and DC Gain Tilt of Erbium–Doped Fiber Amplifiers".

Journal of Lightwave Technology, vol. 7, No. 4, Apr. 1989, pp. 615–624, Frenkel et al., "Angle–Tuned Etalon Filters for Optical Channel Selection in High Density Wavelength Division Multiplexed Systems".

EPO Search Report, EP 96 10 8813, dtd 19 Dec. 1996.

Proceedings of Trends in Optical Fibre Metrology and Standards (NATO), 27 Jun. 1994–8 Jul. 1994, pp. 511–525 SP000609657, Malzahn, "EDFA Testing".

Hewlett–Packard Journal, vol. 44, No. 1, Feb. 1993, pp. 11–19, SP 000359156, Maisenbacher et al., "Tunable Laser Sources for Optical Amplifier Testing".

*Primary Examiner*—Mark Hellner

[57] ABSTRACT

This invention relates particularly to an arrangement for operating and testing in the field of optical communication networks and to an arrangement and a method for an operational test of optical devices, such as erbium-doped fiber amplifiers (EDFAs). The device under test is connected via optical fibers with a tunable laser and an optical signal analyzer. A pattern generator controls the tunable laser to generate a set of signals with different wavelengths $\lambda 1$ to $\lambda 4$, one after the other, within the recovery time of the device under test. Thereby, the operational behavior of a device under test, having a recovery time, and which is applied to several signals with different wavelengths present at the same time, can be tested by a single tunable laser.

10 Claims, 6 Drawing Sheets

ARRANGEMENT AND METHOD FOR OPERATING AND TESTING AN OPTICAL DEVICE

This application is a Continuation-in-part of U.S. patent application Ser. No. 08/565,379, filed Nov. 30, 1995, now abandoned.

FIELD OF THE INVENTION

This invention relates to test equipment in the field of optical communication networks and, more particularly, to an arrangement and a method for operating and testing optical devices, such as erbium-doped fiber amplifiers (EDFA's).

BACKGROUND OF THE INVENTION

Arrangements and methods for the operational test of active and passive optical devices, such as amplifiers, are commonly used in optical communication systems. In practice there is a need for testing wavelength dependent devices or components for their wavelength dependence. This requires testing of several device parameters over a single wavelength and testing with multiple wavelengths. Testing at a single wavelength is easily achieved with a laser source. For testing over a wavelength range, commonly a tunable laser or other sources are used.

In practice there is a need to test devices with multiple wavelengths applied at the same time. Such devices are, for example, EDFA's used in wavelength division multiplexing (WDM) applications. For such applications, it is known to use several single wavelength laser sources or a set of tunable laser sources. As several laser sources are needed to perform these tests in the mentioned applications, the test equipment is very expensive and difficult to handle.

Thus, there is a need for an arrangement and a method for testing optical devices with multiple wavelengths, applied at the same time to the device under test.

SUMMARY OF THE INVENTION

The present invention relates to an arrangement and a method for operating and testing an optical device which generates multiple signals with different wavelengths.

Basically, an arrangement according to the invention comprises:
- only one optical source for generating multiple optical signals which are applied, one after the other, to said optical device to be tested;
- switching means for applying said multiple optical signals of said optical source one after the other to said optical device; and
- analyzing means analyzing a response signal of said optical device to be tested.

The invention needs only one multiplexed laser source which generates multiple wavelengths so that the component, device or system under test, having a recovery time, reacts in the same way, as it does when many single laser sources are applied at the same time. Thus, the core of the invention is to time multiplex the multiple wavelengths generated by a tunable laser or another source and to perform time multiplexing so fast that the component, device or system under test, having a recovery time, does not recognize that the different wavelengths are applied one after the other. It will be understood that the device under test can be any optical device in the field of laser technology which exhibits the mentioned recovery time, such as optical devices in optical communication networks, biological and chemical substances, particularly cells and DNA-structures and photosensitive drums in laser printers etc.

According to one embodiment of the invention the device under test is an optical amplifier, in particular an erbium-doped fiber amplifier (EDFA) or a praseodymium-doped fiber amplifier (PDFA). An important parameter to measure is the gain and noise figure of this amplifier. In future applications this amplifier may be used in wavelength division multiplexed systems. In the current state, these systems use four different channels (wavelengths) to transmit optical signals. Thus, for a complete operational test of the amplifier, four optical signals with different wavelengths have to be applied for operation and testing. Due to the physics of the EDFA, the recovery time from the noise level with signal applied to the amplifier to the noise level without signal is slow, i.e. within about 10 milliseconds (typical recovery time of an EDFA or PDFA), the noise level increases from a very low level to a stable level. According to the invention, four different wavelengths generated by a single tunable laser are applied, one after the other, to the device under test within its recovery time, so that the device under test does not recognize that there is only one wavelength signal present at a time. Preferably, all different wavelengths are applied within a time interval from 10 to 30 microseconds, particularly 12–15 microseconds, i.e. at low recovery.

The main advantage of the invention is that one single fast multiplexed tunable laser source is sufficient to operate a device with several channels or to perform the same measurements as a set of laser sources, each generating a signal with a single wavelength. With the arrangement according to the invention, the operation of the mentioned tests at multiple wavelengths can be performed less expensive and more easily than by a set of lasers.

According to a first embodiment of the invention, a tunable laser is used to generate the multiple optical signals. A tunable laser allows generation of optical signals with different wavelengths, one after the other.

According to a second embodiment of the invention, the control input of the tunable laser is connected to the output of a pattern generator. The pattern generator multiplexes the multiple different wavelength signals generated by the tunable laser. The pattern generator enables adjustment over a wide range of the time interval between switching from one wavelength to another of the signals generated by the tunable laser. It will be understood that the pattern generator can be substituted by any other device which switches the tunable laser from one wavelength to another within low recovery of the device under test.

According to a third embodiment of the invention, an optical source is used instead of a laser. Such a source generates several wavelengths at the same time. According to the invention, a rotating set of filters that are transparent at the different wavelengths at which the device operates, are disposed between the output of the white light source and the input of the optical component, device or system to be tested. The rotation of the set of filters is carried out in such a manner that the different wavelengths of the light generated by the source are applied to the device under test or under operation, one after each other, within the recovery time of the device under test.

In a fourth embodiment the optical device to be tested or to be operated is an amplifier, in particular an erbium-doped fiber amplifier (EDFA) which can be used in wavelength division multiplexing applications and works under multiple wavelengths simultaneously.

It is understood and expressly noted that the present invention relates to all useful and novel combinations of the above disclosed features, whether alone or in any other arbitrary combination. Furthermore, all cited advantages can be seen as objects solved by the invention in its entirety.

BRIEF DESCRIPTION OF THE DRAWINGS

For better understanding of the present invention, together with other and further objects, advantages and capabilities thereof, reference is made to the accompanying drawings, which are incorporated herein by reference and in which.

DETAILED DESCRIPTION OF THE INVENTION

Figure 1:
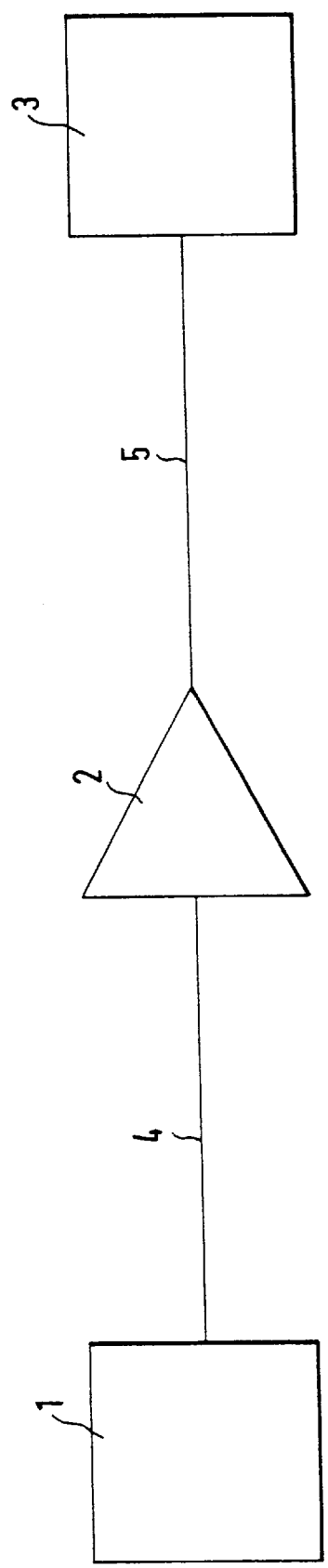
FIG. 1 depicts a block diagram of an arrangement generating multiple input signals for testing an erbium-doped fiber amplifier (EDFA) according to prior art.

FIG. 1 shows a known arrangement for testing various parameters of an erbium-doped fiber amplifier (EDFA) 2. The output of a tunable laser 1 is connected with the input of EDFA 2 via an optical fiber 4. The output of EDFA 2 is connected with the input of an optical signal analyzer (OSA) 3 via an optical fiber 5. For analyzing the characteristics of the EDFA at different wavelengths, the tunable laser 1 is switched to a first wavelength for a first measurement. The optical signal analyzer 3 analyzes the various parameters of the EDFA, particularly gain and noise, and displays them to the operator. To analyze the characteristics of the EDFA under the influence of a signal with a second wavelength, the operator switches the tunable laser source 1 to a second wavelength and so on.

Figure 2:
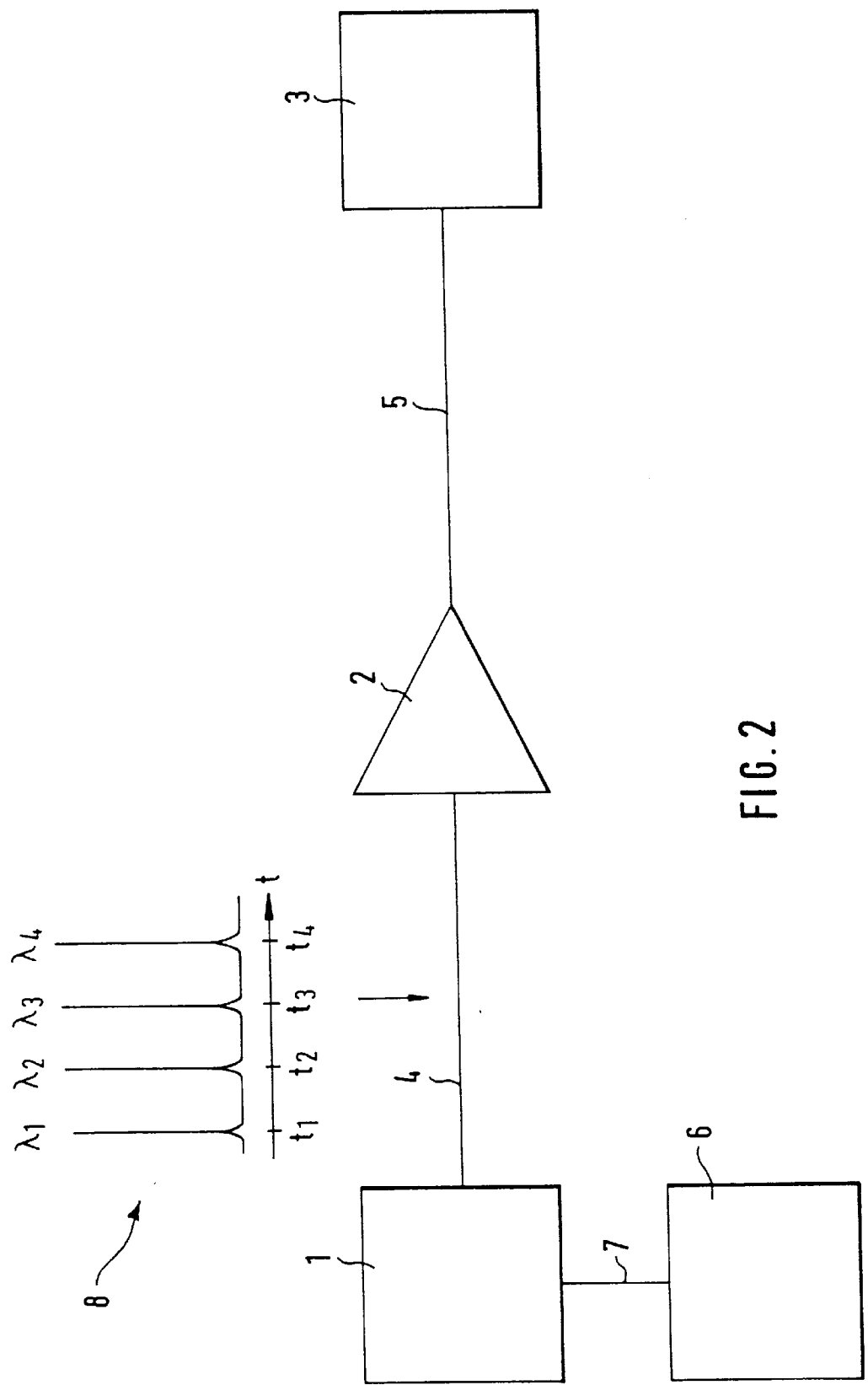
FIG. 2 shows a block diagram of a first arrangement for testing an optical device according to the invention comprising a pattern generator controlling the time interval between the different signals generated by a tunable laser.

FIG. 2 is a block diagram of an apparatus arrangement for testing an optical device according to the invention. The output of a tunable laser 1 is connected with the input of the EDFA 2 via an optical fiber 4. The output of the EDFA is connected with the input of an optical signal analyzer (OSA) 3 via an optical fiber 5. The arrangement according to the invention further comprises a pattern generator 6. The output of the pattern generator 6 is connected via an electrical cable 7 with the control input of the tunable laser 1. The output signal of pattern generator 6, which will be described in more detail with regard to FIG. 3, controls the tunable laser 1 which generates multiple optical signals with different wavelengths $\lambda 1$, $\lambda 2$, $\lambda 3$ and $\lambda 4$. These multiple signals generated by the laser source 1 and applied to the optical fiber 4 are displayed in diagram 8.

The diagram 8 shows the appearance of the multiple wavelengths $\lambda 1$ to $\lambda 4$ generated by the laser source 1 as a function of time t. With the aid of the pattern generator 6, the laser source 1 generates a signal with the wavelengths $\lambda 1$ at a time t1. Then the tunable laser 1 switches the signal with the wavelength $\lambda 1$ off and switches a signal with the wavelength $\lambda 2$ on at a time t2. In the next step, the laser source 1 switches the signal with the wavelength $\lambda 2$ off and switches a signal with the wavelength $\lambda 3$ on at a time t3. Then the laser source 1 switches the signal with the wavelength $\lambda 3$ off and switches the signal with the wavelength $\lambda 4$ on at a time t4. It will be understood that instead of a pattern generator any other device can be used which controls a tunable laser in the same manner as described.

Furthermore, it will be understood that more or less signals with different wavelengths can be generated by one or more tunable lasers depending on the wavelengths the device under test operates with. The time intervals between the different signals with the wavelengths $\lambda 1$ to $\lambda 4$ can be modified in a way that they are different. Furthermore, the time interval in which a first signal is switched on, can be longer than other time intervals. The power of the different signals can also be adjusted to different magnitudes. A wide range of variation of the different characteristics of the different signals and their time correlation allows to operate the device under test under various conditions in accordance with how they appear in practice. Many different test patterns can be memorized in the pattern generator.

All of the signals with different wavelengths $\lambda 1$ to $\lambda 4$ appear in a time interval t1 to t4 which is in the time interval of the recovery time of the amplifier 2. It will be understood that it is within the scope of the invention to generate various signals with different wavelengths within the recovery time of the specific device under test.

Fiber amplifiers (EDFAs, PDFAs etc.) are active optical components generating a noise signal at their output depending on the input signal and time.

When an optical signal is applied at the input of such amplifiers, the signal leads to a stimulated emission of photons—if the laser condition is fulfilled. The output signal is strong, since most of all photons are in a high energy level and are used to amplify the input signal which stimulates the photons to change their energy to a lower level and resulting to the emission of light which is coherent with the light at the input of the amplifier. Accordingly, there is only a low amount of photons in the high energy level available for a spontaneous emission of light. Thus, the noise level is low.

After switching off the input signal, the stimulation of photons stops. The amplifier still pumps the photons to a high energy level and since no photons are stimulated, the amount of photons which are available for a spontaneous emission of light (noise) increases during the mentioned recovery time. Within about 10 millisesconds (typical recovery time of an EDFA or PDFA), the noise signal increases from a very low level to a stable level.

An optical source 51 according to the invention, shown in FIG. 5 and which will be described later on in more detail, generates multiple optical signals and needs only a few microseconds to switch from one wavelength to another. Within this time interval, the noise level of the amplifier remains (nearly) at the same noise level like before switching off the input signal. Thus, due to the physics of the amplifier, the amplifier under test shows the same behavior under the set of test signals within the recovery time of the amplifier as under conditions in practice, where multiple signals with different wavelengths are present at the same time. The recovery time of the erbium-doped fiber amplifier 2 (EDFA) is in the range of 10 ms.

Figure 3:
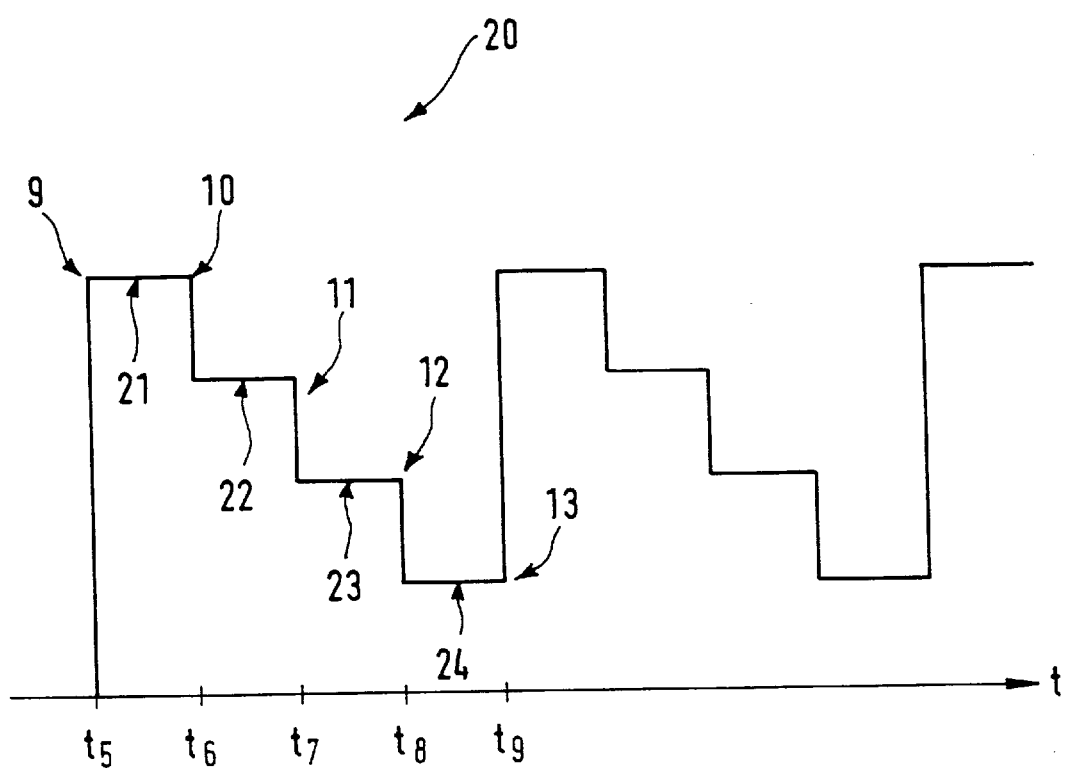
FIG. 3 depicts the control signal generated by the pattern generator in FIG. 2 as a function of time.

FIG. 3 depicts the control signal generated by the pattern generator 6 in FIG. 2 as a function of time. The control signal 20 which is applied to the laser source 1 comprises four steps 21 to 24 at different signal levels. At a time t5 the pattern generator 6 starts generating a control signal. When the signal level reaches a certain value, the controlled laser source 1 generates a signal with a wavelength λ1 for a short time as shown in FIG. 2. Then the control signal is kept constant from edge 9 to edge 10 as indicated by the first step 21. When the control signal drops at a time t6 which is shown at edge 10 the tunable laser 1 generates a signal with the wavelength λ2 for a short time. Then the control signal is kept constant from the time interval t6 to t7 indicated by the second step 22. When the control signal 20 drops again at edge 11, the laser source 1 generates a signal with the wavelength λ3 for a short time. From a time t7 to t8 the control signal is again kept constant as indicated by the third step 23. At the edge 12 the control signal 20 drops again, switching the tunable laser 1 to generate a signal with the wavelength λ4 for a short time. From t8 to t9 the control signal 20 is kept constant as shown by the fourth step 24 and at a time t9, indicated by edge 13 the pattern generator starts repeating the described control signal.

It will be understood that the shown control signal 20 can be easily modified if a tunable laser is used having different control signals than that described.

The time interval t5 to t9 is significantly lower than 10 ms to test the erbium-doped fiber amplifier 2 with a recovery time ≈10 ms. Accordingly, the frequency of the sequence of the steps 21 to 24 is significantly higher than 100 Hz, to operate the optical device at low recovery.

Figure 4:
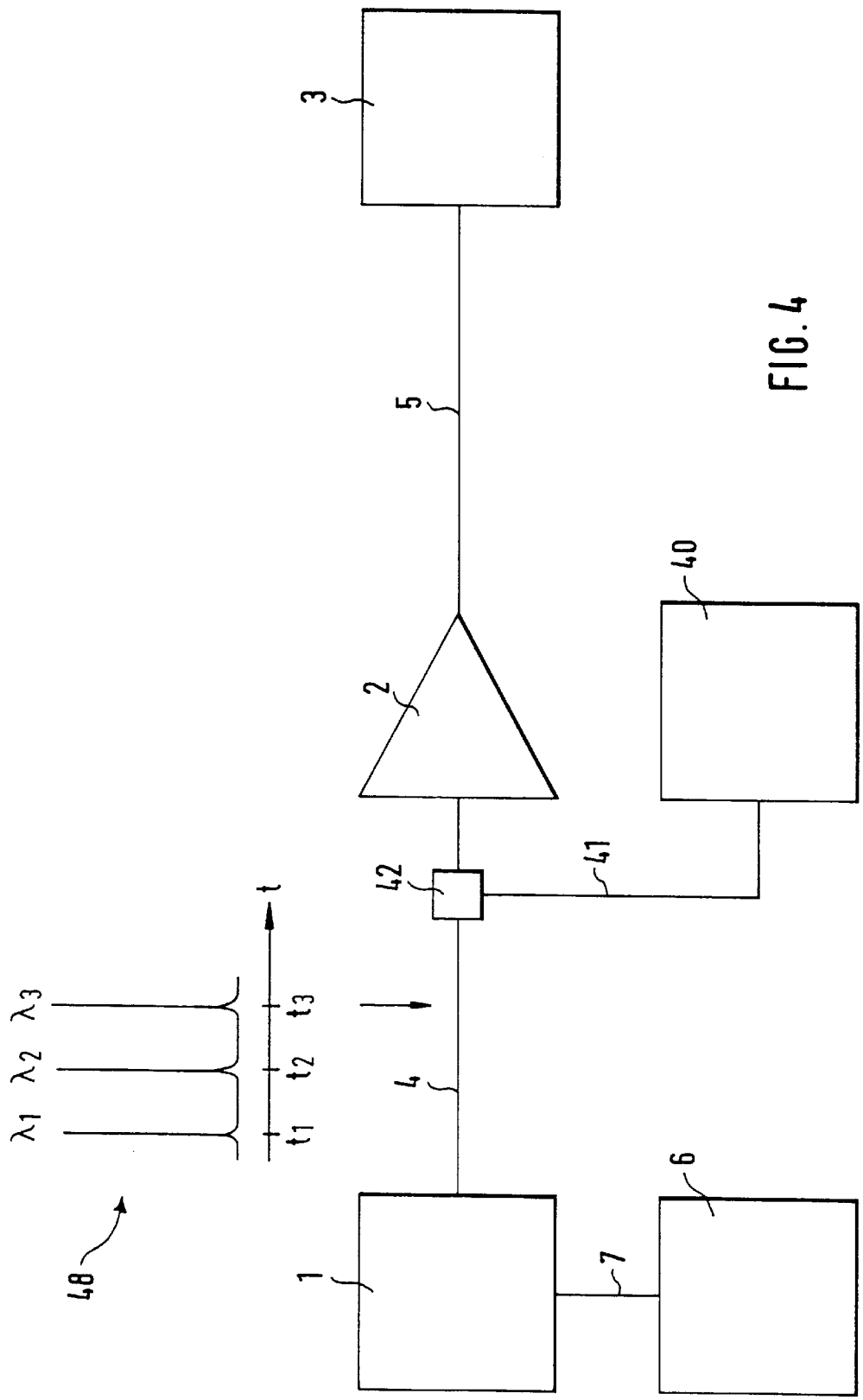
FIG. 4 shows a block diagram of a second arrangement for testing or operating an optical device comprising a further laser with regard to FIG. 3 being separately adjustable.

FIG. 4 shows a block diagram of a second arrangement for testing an optical device 2 comprising a further laser 40 with regard to FIG. 3, being separately adjustable. In addition to FIG. 2, FIG. 4 comprises a further laser 40, an optical fiber 41 and optical coupling means 42 coupling optical fiber 4 and optical fiber 41 to the input of the device under test, being an optical amplifier 2. As shown in diagram 48, tunable laser 1 generates optical signals with the wavelengths $\lambda_1$, $\lambda_2$ and $\lambda_3$. An optical signal with the wavelength $\lambda_4$ is generated by the separately adjustable laser 40. The arrangement according to FIG. 4 enables an optical signal with the wavelength $\lambda_4$ to be generated separately which allows modification of the optical signal, appropriate to the test conditions. Thus, a further degree of freedom in testing an optical device is achieved. It will be understood that further lasers can be used to substitute the optical signals generated by the time multiplexed tunable laser 1 to increase the degree of freedom in adjusting the test conditions.

Furthermore it will be understood that an optical device, such as an erbium-doped fiber amplifier, can be operated via a time multiplexed tunable laser source being triggered by signals to be transmitted optically (not shown). In another embodiment of the invention a tunable laser is triggered by a pattern generator but a further laser is triggered by the signals to be transmitted optically.

Figure 5:
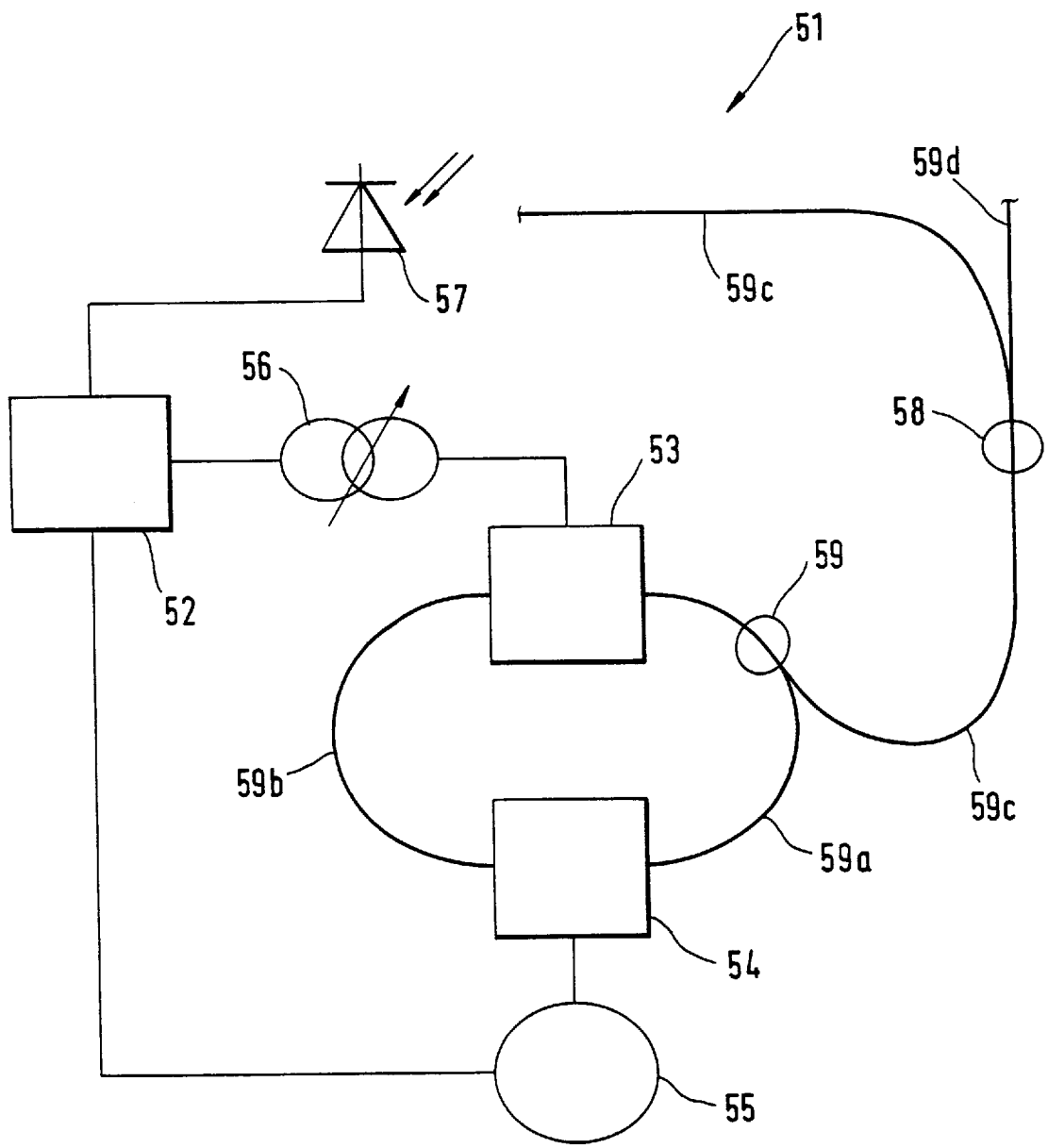
FIG. 5 shows an optical source according to the invention which allows to generate coherent signals with various wavelengths one after another at low recovery of optical amplifiers.

FIG. 5 shows an optical source 51 (a tunable laser), according to the invention, generating multiple optical signals to be applied to the device under test, such as an EDFA or PDFA having a recovery time.

Source 51 comprises a control unit 52, a gain medium 53, an electrically tunable filter 54, such as an acousto optical tunable filter (AOTF), a radio frequency generator 55, an adjustable source of current 56, a monitor unit 57 and beam splitters 58 and 59. Control unit 52 is equipped with a digital to analog converter and an analog to digital converter. Control unit 52 is connected with a data processor unit, such as a computer (PC) or the like and/or a pattern generator (not shown in FIG. 5). These means allow to trigger the control unit 52 to generate two output signals.

The first output signal adjusts the current source 56. Depending on the input signal of the control unit 52 from the data processor unit and/or pattern generator, the source of current 56 generates a current which is applied to the gain medium 53, such as a semiconductor amplifier, generating a coherent optical signal. The power level of the optical signal depends on the applied current.

The second output signal adjusts the radio frequency generator 55. Depending on the input signal of the control unit 52, the generator 55 generates an output signal with a certain frequency which is applied to the AOTF 54. The frequency characteristic of the AOTF depends on the frequency applied to the AOTF. Gain medium 53 and electrically tunable filter 54 each have an input and an output for optical signals. The output of the gain medium 53 is connected with the input of the electrically tunable filter 54 via a fiber 59a. The output of the tunable filter 54 is connected with the input of the gain medium 53 via a fiber 59b. The connections between gain medium 53 and tunable filter are preferably made via polarization maintaining fiber (PMF) and in parallel beam. Preferably, gain medium 53, tunable filter 54 and fibers 59a, 59b are arranged to build up a ring cavity structure.

A beam splitter 59 for output power coupling is arranged in the ring cavity structure, preferably in the vicinity of the output of the gain medium 53. One end of fiber 59c is connected with beam splitter 59, while the other end 59d passes a second beam splitter 58 and is applied to the device under test (not shown in FIG. 5). One end of a fiber 59c is connected with the beam splitter 58 and the other end leads a part of the output signal of optical source 51 to a monitor unit, such as a monitor diode 57. Monitor diode 57 generates an electrical signal, dependent on the frequency and the intensity of the output signal of the optical source 51. Monitor diode 57 is connected with the control unit 52, in order to make optical source 51 to a selfadjusting system. It will be understood that the selfadjustment may be carried out by the control unit 52 itself and/or by a data processor (not shown) when using a comparator (not shown) comparing the desired signal values with the actual signal values.

Figure 6:
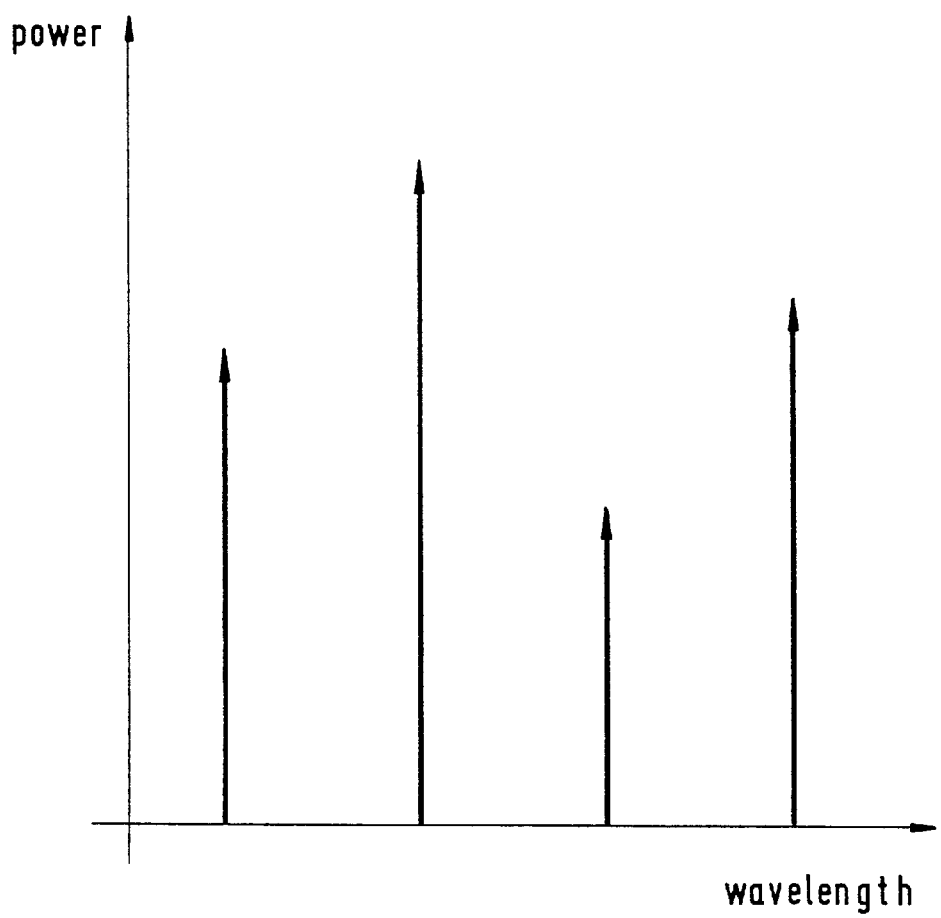
FIG. 6 is a diagram showing output laser power of signals with different wavelengths which are generated by the optical source in FIG. 5; the power of each signal can be adjusted individually.

FIG. 6 shows a diagram with output laser power of the signals with different wavelengths which are generated by the optical source in FIG. 5.

According to the invention, wavelengths tuning, particularly in the range of 1.55 micrometer ($\mu$m), is achieved by an!acousto optical tunable filter (AOTF) 54 as a wavelength filter. A change in wavelength as shown in FIG. 6 is achieved by changing the radio frequency (RF) of radio frenquency generator 55. According to the invention, this can be done very fast, therefore a change in the range of 10 microseconds is possible.

A change in power when switching to another wavelength as shown in FIG. 6 is carried out by changing the drive current of the semiconductor gain medium 53. According to the invention, a change in wavelength and an individual power setting for each wavelength can be carried out within about 12–15 microseconds.

Since this is very fast, the invention allows to set several wavelengths during the recovery time of the device under test (number of settable wavelengths=recovery time of the devices under test/wavelengths and power setting time for each wavelength). In WDM-applications 4, 8, 16 and probably more different wavelengths are needed.

What is claimed is:

1. An arrangement generating multiple optical signals with different wavelengths for application to an optical amplifier, comprising:

a single optical source for generating said multiple optical signals for application to said optical amplifier, one after the other, and switching means for applying said multiple optical signals of said optical source, one after the other, to said optical amplifier, wherein all of said multiple optical signals are applied by said switching means to said optical amplifier, within a recovery time of said optical amplifier, from a noise level with signal applied to a noise level without signal applied.

2. An arrangement generating multiple optical signals with different wavelengths for testing an optical amplifier, comprising:

only one optical source for generating multiple optical signals for application to said optical amplifier to be tested, one after the other, switching means for applying said multiple optical signals of said optical source, one after the other, to said optical amplifier, wherein all of said multiple optical signals are applied by said switching means to said optical amplifier, within a recovery time of said optical amplifier, from a noise level with signal applied to a noise level without signal applied, and analyzing means for analyzing a response signal of said optical amplifier to be tested.

3. An arrangement as defined in claim 1, wherein said optical source is a tunable laser generating said multiple optical signals, one after the other.

4. An arrangement as defined in claim 3, wherein said optical source generates said multiple optical signals, one after the other, within a time interval from 10 to 30 microseconds, particularly from 12–15 microseconds.

5. An arrangement as defined in claim 3, wherein said switching means is a pattern generator which triggers said tunable laser to generate said multiple optical signals, one after the other.

6. An arrangement as defined in claim 1, wherein said optical source generates multiple signals with different wavelengths simultaneously and said switching means comprises a rotating set of filters that are transparent at different wavelengths and are disposed between the output of said optical source and said optical amplifier.

7. An arrangement as defined in claim 1, wherein said optical amplifier is an erbium-doped fiber amplifier (EDFA) or a praseodymium-doped fiber amplifier (PDFA).

8. A method for operating or testing an optical amplifier, comprising the steps of:

a applying a first optical signal with a first wavelength to said optical amplifier, b switching off said first optical signal, c applying a second optical signal with a second wavelength to said optical amplifier, and wherein steps a–c are performed within a recovery time from a noise level with signal applied to said optical amplifier to a noise level without signal applied to said optical amplifier.

9. The method as defined in claim 8, wherein:

said first and said second optical signals are generated by a tunable laser, and steps a–c are carried out by a pattern generator which triggers said tunable laser.

10. An arrangement generating multiple optical signals with different wavelengths for application to an optical amplifier, comprising:

a single optical source for generating said multiple optical signals for application to said optical amplifier, one after the other, said single optical source comprising an optical gain medium having an input and an output, an electrically tunable filter having an input and an output, and polarization maintaining fibers (PMFs), one PMF connecting the output of said gain medium with the input of said electrically tunable filter and one PMF connecting the output of the electronically tunable filter with the input of said gain medium; and switching means for applying said multiple optical signals of said optical source, one after the other, to said optical amplifier, wherein all of said multiple optical signals are applied by said switching means to said optical amplifier, within a recovery time of said optical amplifier, from a noise level with signal applied to a noise level without signal applied.

* * * * *